UNITED STATES PATENT OFFICE.

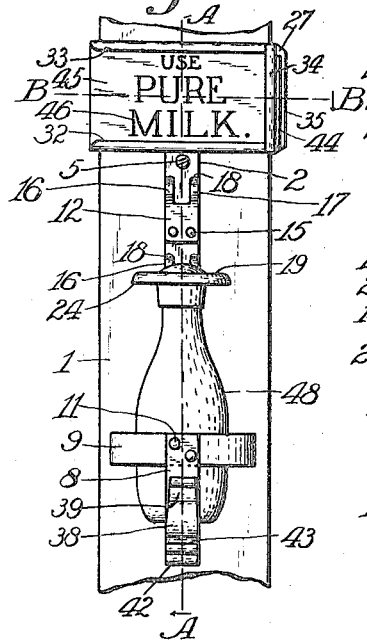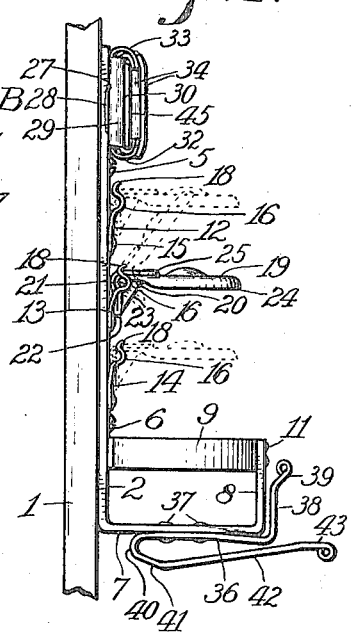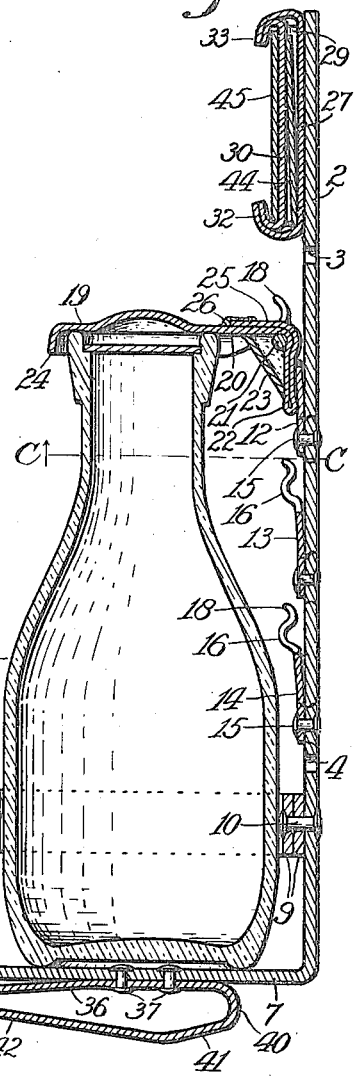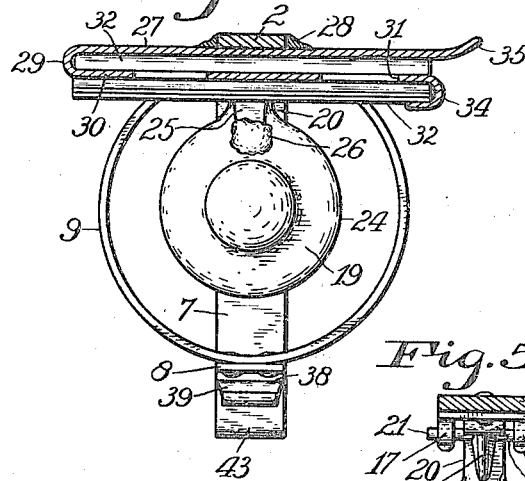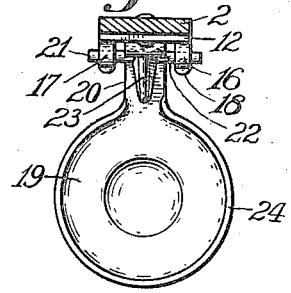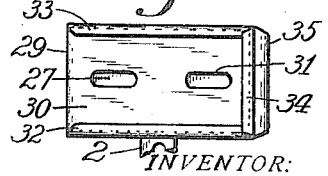

JOHN A. WILDE, OF INDIANAPOLIS, INDIANA.

MILK-BOTTLE HOLDER.

1,190,695.  Specification of Letters Patent.  Patented July 11, 1916.

Application filed December 30, 1914. Serial No. 879,783.

*To all whom it may concern:*

Be it known that I, JOHN A. WILDE, a citizen of the United States, residing at Indianapolis, in the county of Marion and State of Indiana, have invented a new and useful Milk-Bottle Holder, of which the following is a specification, reference being had to the accompanying drawings, and to the letters and figures of reference marked thereon.

This invention relates to an appliance for the use of those who receive daily supplies of milk or cream in bottles from the delivery wagons of dairies, and has reference more particularly to an appliance whereby the bottles of milk are conveniently cared for at the place of delivery or exchanged in a sanitary manner.

An object of the invention is to provide an appliance which shall be so constructed as to be adapted to hold a milk bottle and be adjustable for holding different sizes of bottles so as to be fully protected in a sanitary manner, more especially out of reach of animals, such as cats and dogs, or small children; a particular object being to provide a milk bottle holder having a cover for the bottle adapted to prevent animals from licking the mouth of the bottle with the possibility of contaminating it with disease germs.

A still further object is to provide a combined milk bottle and ticket holder adapted to receive a milk ticket of the character in common use so as to protect the ticket from rain or snow in case the holder and milk bottle must be exposed to the elements, a specific object being to provide a milk bottle holder with a removable name plate or card which may contain an advertisement or such printed matter as may be of information to either or both the seller and the purchaser of the milk.

A still further object is to provide a milk bottle and ticket holder that may be cheaply produced and be adapted to be readily set up and easily operated in either protected or unprotected positions and under all of the various weather conditions, and be durable and economical and withal sanitary in use.

With the above-mentioned and other objects in view the invention consists in a frame adapted to be securely supported and to hold bottles of different sizes, the frame being provided with a bottle cover that is adjustable to different heights so as to be adapted to cover the different sizes of bottles commonly used; and means for holding and protecting different devices such as cards or plates and also means for holding papers or other articles.

The invention consists also further in the novel parts, and in the combinations and arrangements of parts, as hereinafter particularly described and further defined in the accompanying claims.

Referring to the drawings,—Figure 1 is a front elevation of the holder constructed in accordance with the invention and mounted on an upright support, the holder supporting a milk bottle of medium size in proper position; Fig. 2 is a side elevation of the holder secured to an upright support; Fig. 3 is a vertical section of the holder approximately on the line A A on Fig. 1 but showing a bottle of larger size arranged on the holder; Fig. 4 is a sectional plan view of the holder on the line B B on Fig. 1; Fig. 5 is an inverted sectional plan view of the holder on the line C C on Fig. 3; and, Fig. 6 is a front view of the ticket holder.

Similar reference characters on the different figures of the drawings indicate corresponding elements or features of construction herein referred to.

A practical embodiment of the invention requires the utilization of a suitable support 1 which may be in the form of a post or an external member of a building. The holder comprises a supporting back plate or board 2 having a hole 3 in its upper portion and a hole 4 in its lower portion to receive screws or fasteners 5 and 6, respectively, whereby to firmly secure the holder to the supporting medium 1. The lower portion of the back plate has an arm 7 fixed thereon which extends horizontally forward and has an upright portion 8 thereon that extends opposite to the back plate. An annular frame member or ring 9 is formed of suitable metal and is secured to the back plate and also to the upper portion of the arm by means of rivets 10 and 11. The frame member or ring is sufficiently large in diameter to receive the body portion of the larger or quart size of milk bottle which is to be supported upon the horizontal member or portion of the arm. The front of the back plate is provided with a number of pivot plates 12, 13, 14, for pivotally supporting a cover for the bottle. The plates are alike and the lower portion of each one is secured to the back plate by means of rivets 15, from which the plates extend upward and are yieldingly held against the front of the back plate, each pivot plate preferably being composed of spring steel, and the upper portion thereof has two upwardly extending yielding pivot bearings 16 and 17 that are approximately bow-shaped so as to receive and support a pivot or hinge pin between the bearings and the back plate 2, each pivot bearing having an outwardly curved guide portion 18 to be engaged by the pivot for forcing the pivot bearing forward to receive the pivot. A suitable cover 19 is provided which has an arm 20 thereon that is provided with a relatively fixed pivot or hinge pin 21 that is supported by the pivot bearings to permit the cover to be swung upward or to be removed and connected to another pair of pivot bearings. In order to prevent the cover from dropping to any considerable extent below the horizontal when not placed upon a bottle, the arm 20 is provided with a downwardly extending projection 22 that extends between the pivot bearings to the front of the adjacent pivot plate, the projection having a brace 23 connected thereto and with the arm of the cover, the latter having a downwardly extending flange 24. The projection 22 and its brace may be suitably composed of sheet metal formed integrally with the arm and the cover and doubled so as to form a reinforcing plate 25 that is suitably fixed to the adjacent portions of the arm and projection, as by means of solder 26.

The ticket holder is composed of sheet metal, preferably of a single piece, and comprises a back plate 27 that is fixedly secured to the back plate 2 above the uppermost pivot plate, as by means of solder 28, and is bent over so as to form an end portion 29 of a ticket receptacle and a front 30 extending opposite to the back plate 27. Preferably the front plate 30 of the receptacle has apertures 31 therein through which the ticket may be engaged and pushed out of the receptacle if not projecting from the mouth of the receptacle. The holder has a bottom 32 and a top 33 formed by bending the metal forward toward the front plate so as to form guides opposite to the front plate. The front plate 30 is bent over so as to form an end 34 or stop for a name plate or card, and also serves as a guide for the milk ticket to the mouth of its receptacle, the back plate 27 having also a curved guide 35 thereon to lead the ticket into the mouth of the receptacle. The holder is provided also with spring clips for holding milk-pails or pitchers and is composed of a plate 36 secured by rivets 37 to the under side of the horizontal arm portion 7, the plate 36 extending forward and having a finger 38 thereon that extends forward at the front of the arm portion 8 to hold a milk pail, pitcher, ticket or papers on the plate 36 at the front of the arm portion 8, the finger having an outwardly extending end portion 39 to guide the paper or the handle of the milk-container behind the finger. The plate 36 extends also rearward and is bent downward to form a crook 40 from which a tongue extends, the base portion 41 of the tongue extending forward and downwardly for supporting an article such as above mentioned, and the forward portion 42 extending thence upward approximately to the base of the finger 38 and having a projection 43 that extends farther forward as a finger piece for pushing the tongue downward if found desirable. A milk ticket 44 is inserted into the receptacle and preferably should project slightly when placed against the end 29 so as to be readily removed. A card or plate 45 is placed on the front of the front plate 30 and retained by the guides thereon and may have any desired sign 46 thereon, either for advertising purposes or for the mutual advantage of the seller and the purchaser of the milk.

In practical use the customer places an empty bottle in the holder as illustrated, the bottle presumably having been thoroughly cleansed so as to not entirely depend upon the cleanliness of the seller when refilling the bottles. In case the bottle is of the larger or quart size the cover is connected with the uppermost pivot plate 12, and if the bottle be one of the smaller sizes the cover is readjusted to the proper one of the pivot plates below. The bottle is readily placed in position or removed from the holder when the cover 19 is slightly lifted from the top or mouth of the bottle. Two sizes of bottles 47 and 48 are illustrated, being quart and pint sizes respectively. In some cases the purchaser may leave the milk ticket in the holder at all times to be removed and punched or marked by the milk seller, who on delivering the milk will remove the empty bottle and place the full bottle in the holder which cannot be left uncovered since the cover must fall by the force of gravity onto the top of the bottle when the position of the cover is adjusted to the requirements, it being understood that it will be to the interest of the seller to lower the position of the cover in case he delivers a bottle of milk of smaller capacity than the bottle he removes from the holder. If the purchaser desires to inform the seller as to the quantity of milk desired, a note may be written and placed conspicuously behind the finger 38, and in some cases the seller may in like manner desire to leave a note for the purchaser. The clips below the arm of the holder may be used by the newsboy for holding the daily paper or for other purposes, and particularly in case the purchaser desires to hang a small pail or pitcher under the holder to receive an unusually large quantity of milk, which may in some cases not be bottled.

Having thus described the invention, what is claimed as new is—

1. A milk bottle holder including an upright back member, a bottle-support fixed on the member, a plurality of pivoting devices mounted on the member above the bottle-support, and a cover for the bottle having a pivot to be removably connected with either one of the plurality of pivoting devices and supported by bottles of different sizes.

2. A bottle holder comprising a back plate, an arm fixed on the back plate for bodily supporting a bottle, a guide connected to the back plate for guiding the bottle on the arm, a plurality of pivot plates secured to the back plate and extending elastically in the direction away from the arm, each pivot plate having two pivot bearings arranged to coöperate with the back plate, and a cover for the bottle having an arm provided with a pivot that is removably connected with the pivot bearings of one of the pivot plates, the arm of the cover extending between the two pivot bearings.

3. In a bottle-holder, the combination of a normally upright back plate, a supporting arm fixed on and projecting horizontally from the back plate, a pivot plate secured to the front of the back plate above said arm and having two pivot bearings on the upper portion thereof, and a cover having an arm thereon that is pivotally connected to said bearings, the cover having also a projection that extends downwardly to the pivot plate below said bearings and having also a flange that extends downward toward said arm, said cover being normally horizontal and movable upwardly on its pivotal connection.

In testimony whereof, I affix my signature in presence of two witnesses.

JOHN A. WILDE.

Witnesses:
E. T. SILVIUS,
J. H. GARDNER.